United States Patent
Loomis

(10) Patent No.: US 6,864,781 B1
(45) Date of Patent: Mar. 8, 2005

(54) PORTABLE PAGING SYSTEM

(76) Inventor: Thomas O. Loomis, 144 Stuart Rd., Racine, WI (US) 53406

( * ) Notice: Subject to any disclaimer, the term of this patent is extended or adjusted under 35 U.S.C. 154(b) by 343 days.

(21) Appl. No.: 10/122,843

(22) Filed: Apr. 12, 2002

(51) Int. Cl.[7] .............................. G08B 5/22; B60R 25/10
(52) U.S. Cl. .................... 340/7.57; 340/7.61; 340/7.62; 340/426.21
(58) Field of Search .............................. 340/7.57, 7.62, 340/7.61, 426.21

(56) References Cited

U.S. PATENT DOCUMENTS

| | | | |
|---|---|---|---|
| 4,797,671 A | | 1/1989 | Toal, Jr. |
| 4,962,545 A | * | 10/1990 | Klaczak et al. ........... 455/200.1 |
| 5,021,780 A | * | 6/1991 | Fabiano et al. ............. 340/994 |
| 5,144,294 A | * | 9/1992 | Alonzi et al. .......... 340/825.49 |
| 5,278,556 A | | 1/1994 | Oh |
| 5,668,543 A | | 9/1997 | Jones |
| 5,680,119 A | | 10/1997 | Magliari et al. |
| 5,710,548 A | | 1/1998 | Lemense |
| 5,808,560 A | | 9/1998 | Mulanax |
| D409,577 S | | 5/1999 | Doppelt et al. |

* cited by examiner

*Primary Examiner*—Michael Horabik
*Assistant Examiner*—Kimberly Hamilton

(57) ABSTRACT

A portable paging system for responsive signaling between a first person and a second person. The portable paging system includes a housing. The housing has a top side, a bottom side and peripheral wall integrally coupled to the bottom and top sides and extending therebetween such that the housing is generally hollow. A microprocessor is adapted to receive a transmitted signal and illuminate a light. The microprocessor is securely mounted in the housing. A light is securely mounted to the top side of the housing. The light is electrically coupled to the microprocessor. A receiver receiving a transmitted signal is positioned in the housing and operationally coupled to the microprocessor. A transmitting device selectively transmits a signal to the receiver over a distance of less than one mile.

4 Claims, 6 Drawing Sheets

PORTABLE PAGING SYSTEM

BACKGROUND OF THE INVENTION

1. Field of the Invention

The present invention relates to paging systems and more particularly pertains to a new portable paging system for responsive signaling between a first person and a second person.

2. Description of the Prior Art

The use of paging systems is known in the prior art. More specifically, paging systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,680,119; U.S. Pat. No. 5,021,780; U.S. Pat. No. 4,797,671; U.S. Pat. No. 5,710,548; U.S. Pat. No. 5,728,556; U.S. Des. Pat. No. 409,577; U.S. Pat. No. 5,808,560; and U.S. Pat. No. 5,668,543.

While these devices fulfill their respective, particular objectives and requirements, the aforementioned patents do not disclose a new portable paging system. The inventive device includes a housing. The housing has a top side, a bottom side and peripheral wall integrally coupled to the bottom and top sides and extending therebetween such that the housing is generally hollow. A microprocessor is adapted to receive a transmitted signal and illuminate a light. The microprocessor is securely mounted in the housing. A light is securely mounted to the top side of the housing. The light is electrically coupled to the microprocessor. A receiver receiving a transmitted signal is positioned in the housing and operationally coupled to the microprocessor. A transmitting device selectively transmits a signal to the receiver over a distance of less than one mile.

In these respects, the portable paging system according to the present invention substantially departs from the conventional concepts and designs of the prior art, and in so doing provides an apparatus primarily developed for the purpose of responsive signaling between a first person and a second person.

SUMMARY OF THE INVENTION

In view of the foregoing disadvantages inherent in the known types of paging systems now present in the prior art, the present invention provides a new portable paging system construction wherein the same can be utilized for responsive signaling between a first person and a second person.

The general purpose of the present invention, which will be described subsequently in greater detail, is to provide a new portable paging system apparatus and method which has many of the advantages of the paging systems mentioned heretofore and many novel features that result in a new portable paging system which is not anticipated, rendered obvious, suggested, or even implied by any of the prior art paging systems, either alone or in any combination thereof.

To attain this, the present invention generally comprises a housing. The housing has a top side, a bottom side and peripheral wall integrally coupled to the bottom and top sides and extending therebetween such that the housing is generally hollow. A microprocessor is adapted to receive a transmitted signal and illuminate a light. The microprocessor is securely mounted in the housing. A light is securely mounted to the top side of the housing. The light is electrically coupled to the microprocessor. A receiver receiving a transmitted signal is positioned in the housing and operationally coupled to the microprocessor. A transmitting device selectively transmits a signal to the receiver over a distance of less than one mile.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable paging system apparatus and method which has many of the advantages of the paging systems mentioned heretofore and many novel features that result in a new portable paging system which is not anticipated, rendered obvious, suggested, or even implied by any of the prior art paging systems, either alone or in any combination thereof.

It is another object of the present invention to provide a new portable paging system which may be easily and efficiently manufactured and marketed.

It is a further object of the present invention to provide a new portable paging system which is of a durable and reliable construction.

An even further object of the present invention is to provide a new portable paging system which is susceptible of a low cost of manufacture with regard to both materials and labor, and which accordingly is then susceptible of low prices of sale to the consuming public, thereby making such portable paging system economically available to the buying public.

Still yet another object of the present invention is to provide a new portable paging system which provides in the apparatuses and methods of the prior art some of the advantages thereof, while simultaneously overcoming some of the disadvantages normally associated therewith.

Still another object of the present invention is to provide a new portable paging system for responsive signaling between a first person and a second person.

Yet another object of the present invention is to provide a new portable paging system which includes a housing. The housing has a top side, a bottom side and peripheral wall integrally coupled to the bottom and top sides and extending therebetween such that the housing is generally hollow. A microprocessor is adapted to receive a transmitted signal and illuminate a light. The microprocessor is securely mounted in the housing. A light is securely mounted to the top side of the housing. The light is electrically coupled to the microprocessor. A receiver receiving a transmitted signal is positioned in the housing and operationally coupled to the microprocessor. A transmitting device selectively transmits a signal to the receiver over a distance of less than one mile.

Still yet another object of the present invention is to provide a new portable paging system that may be used anywhere two people isolated from each other need to send a signal to each other so that they may meet in one location.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
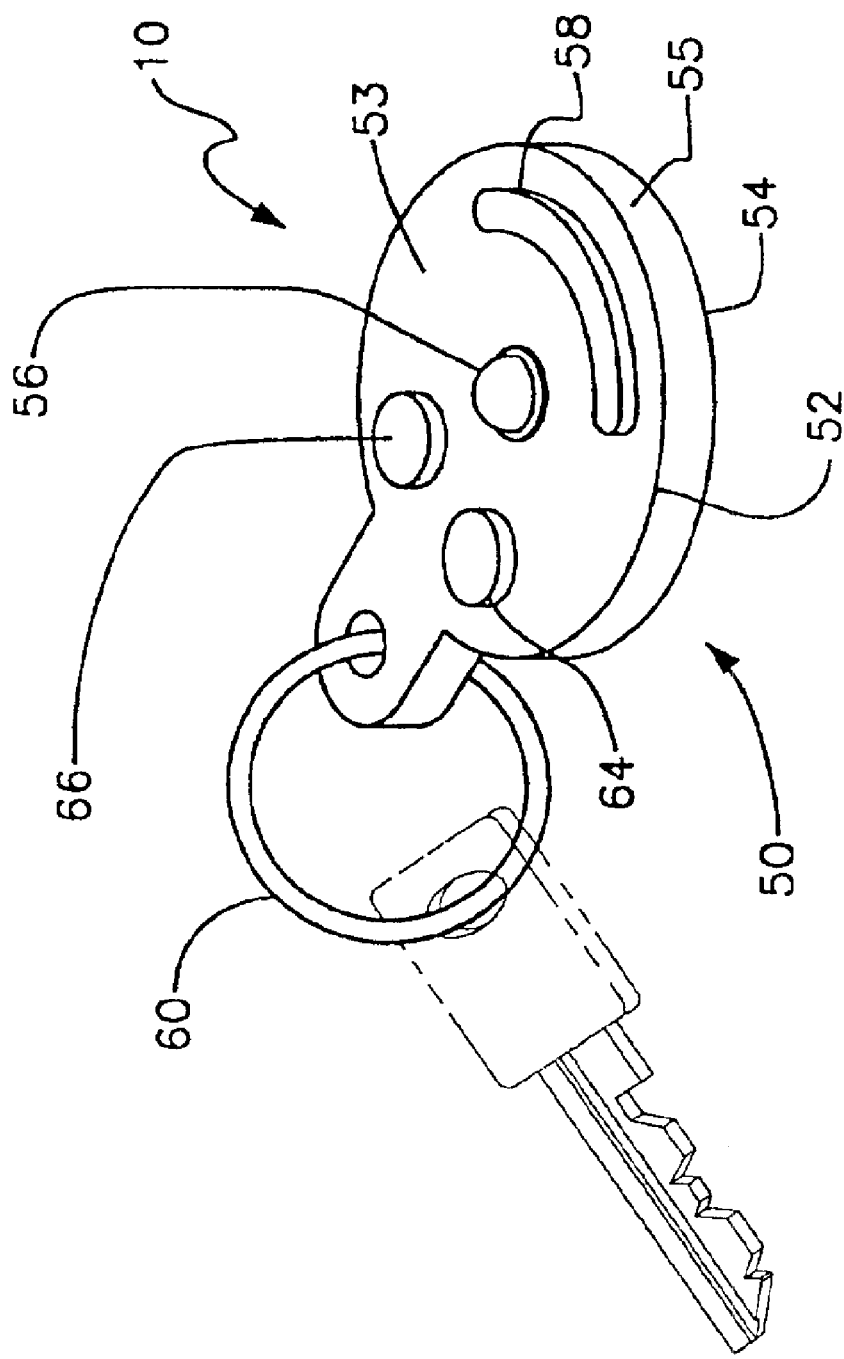
FIG. 1 is a schematic perspective view of the transmitting device of a new portable paging system according to the present invention.
Figure 2:
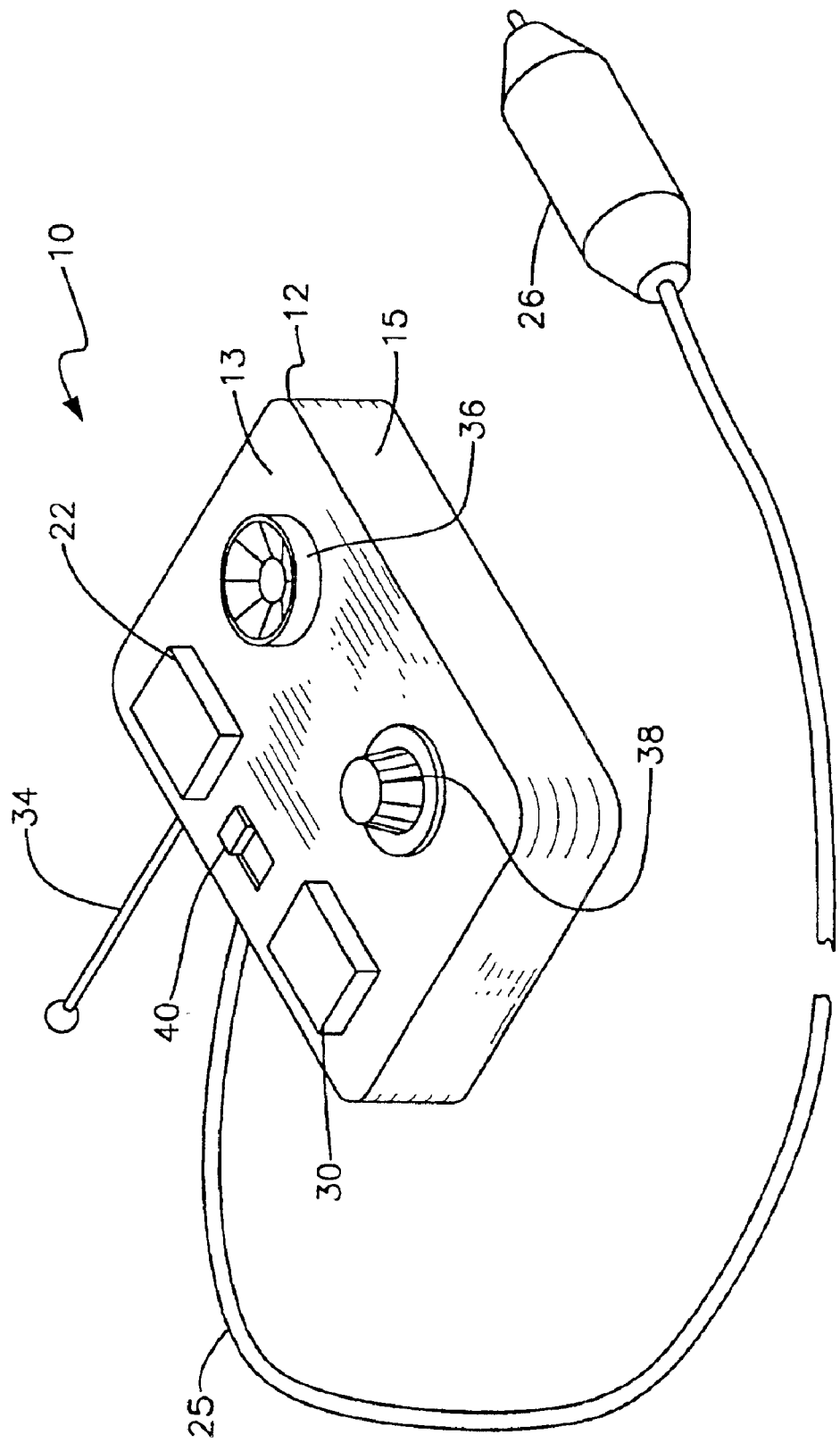
FIG. 2 is a schematic perspective view of the housing of the present invention.
Figure 3:
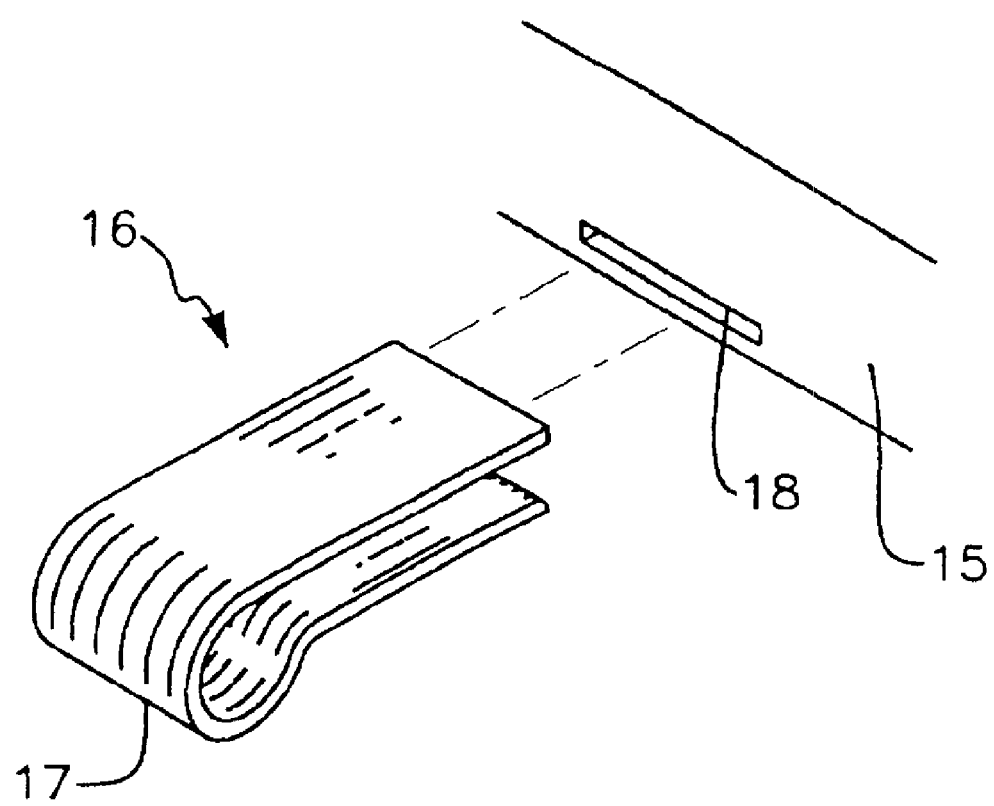
FIG. 3 is a schematic perspective view of a securing means of the present invention.
Figure 4:
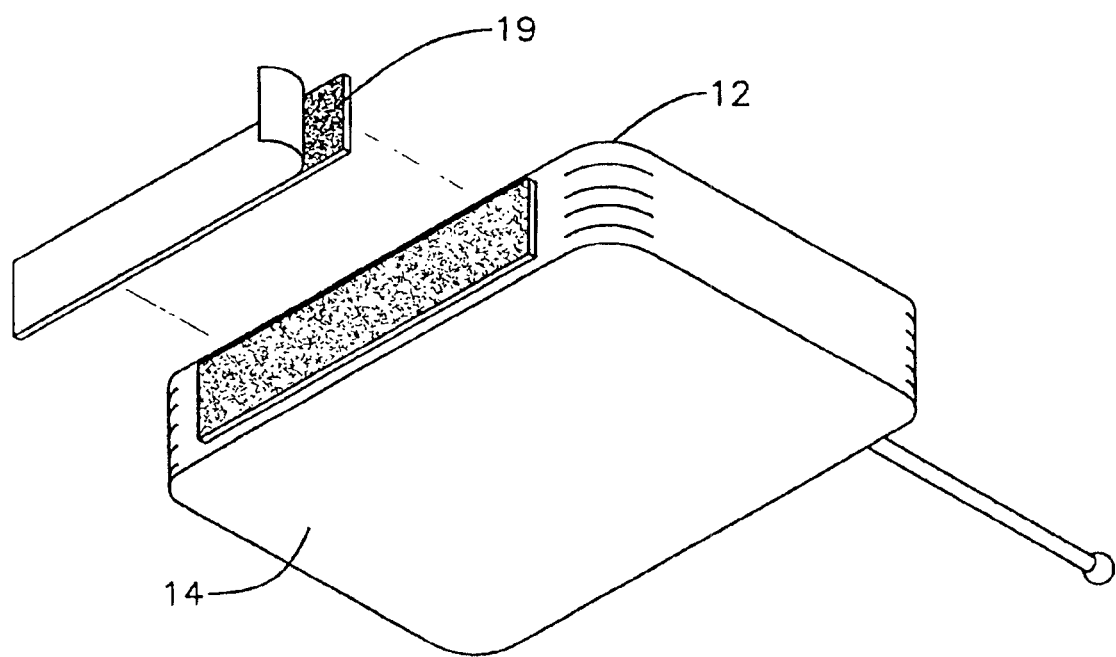
FIG. 4 is a schematic perspective view of a securing means of the present invention.
Figure 5:
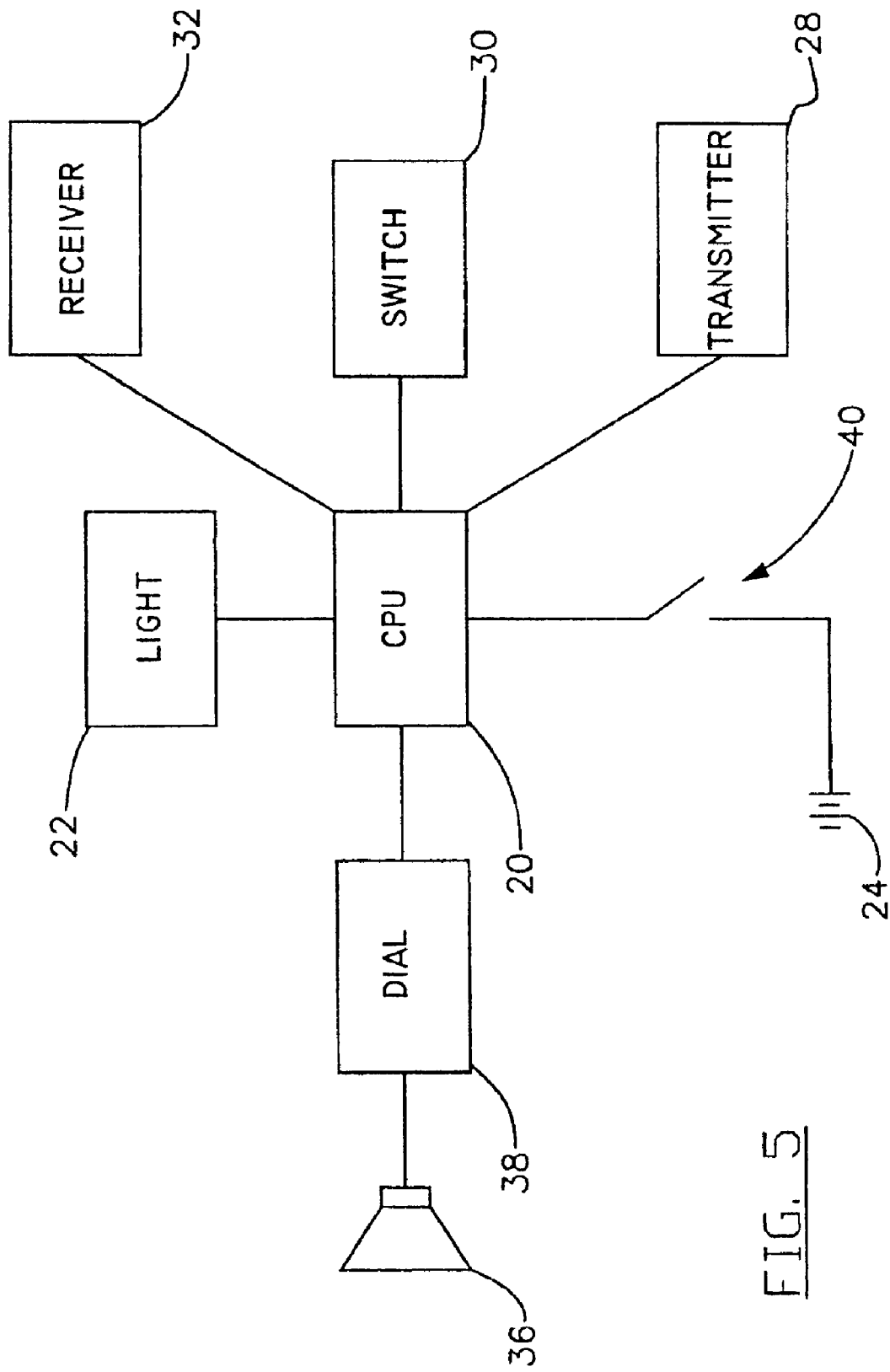
FIG. 5 is an electronic schematic view of the present invention.
Figure 6:
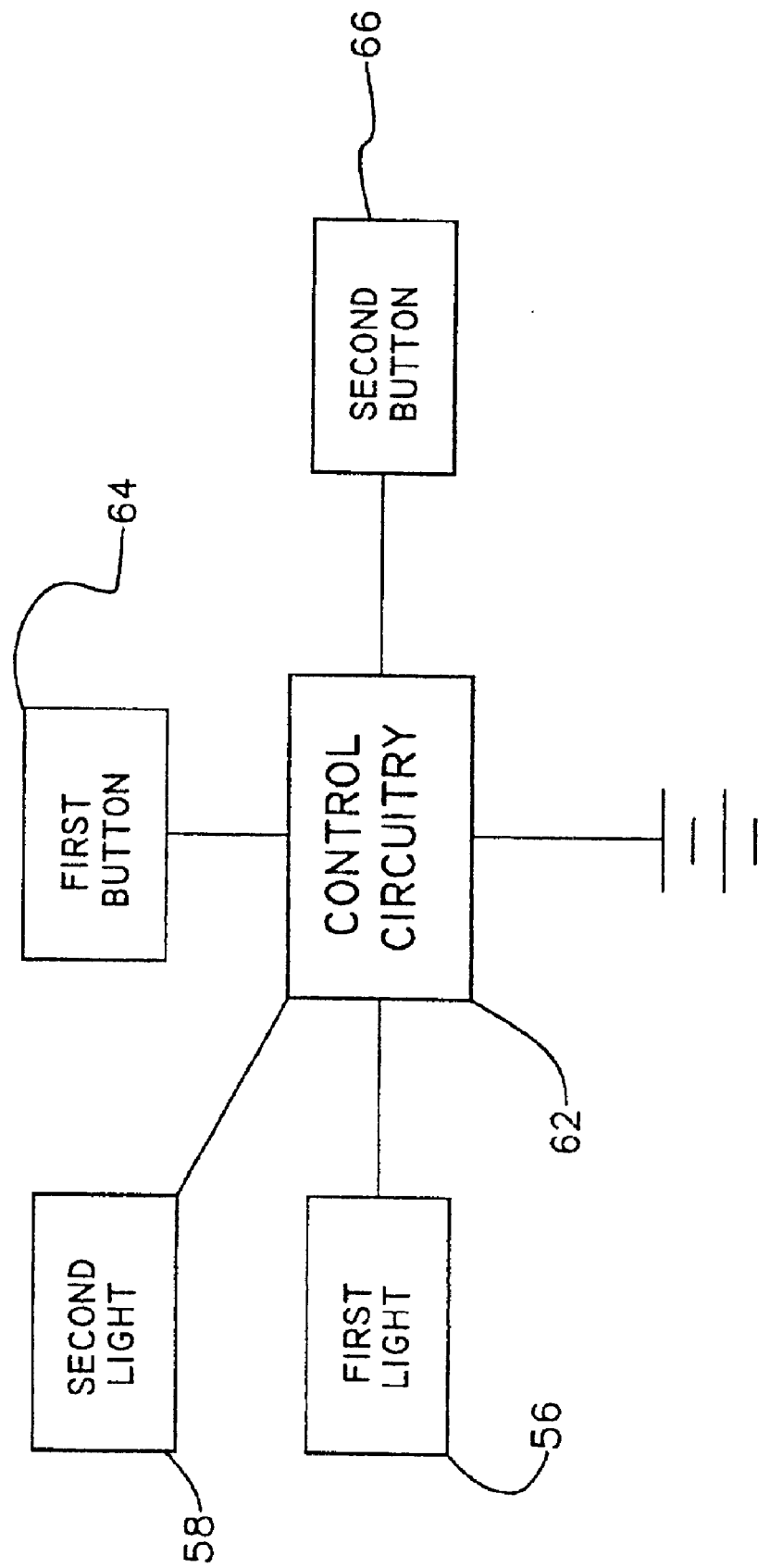
FIG. 6 is an electronic schematic view of the present invention.

With reference now to the drawings, and in particular to FIGS. 1 through 6 thereof, a new portable paging system embodying the principles and concepts of the present invention and generally designated by the reference numeral 10 will be described.

As best illustrated in FIGS. 1 through 6, the portable paging system 10 generally includes a housing 12. The housing 12 has a top side 13, a bottom side 14 and peripheral wall 15 integrally coupled to the bottom 14 and top 13 sides and extending therebetween such that the housing 12 is generally hollow.

Preferably, a securing means 16 removably secures the housing 12 to a visor of an automobile. The securing means 16 is ideally comprised of a U-shapes clip 17 which is insertable into a slot 18 extending into the housing 12. The clip 17 may then be coupled to the sun visor of an automobile. Also envisioned is an adhesive strip 19 positioned on the housing 12.

A conventional microprocessor 20 is adapted to send a signal, to a transmitter, send an audio signal to a speaker, receive a transmitted signal, and illuminate a light. The microprocessor 20 is securely mounted in the housing 12. The microprocessor 20 is adapted to distinguish between a first signal and a second signal received and to send a distinguishing audio signal for each of the received signals to a speaker.

A light 22 is securely mounted to the top side 13 of the housing 12. The light 22 is electrically coupled to the microprocessor 20.

A power supply 24 powers the microprocessor 20. The power supply 24 is operationally coupled to the microprocessor 20. The power supply 24 comprises a cord 25 having an end has a male plug 26 electrically coupled thereto. The male plug 26 is preferably of the type used to plug into an automobile's electrical supply. Also envisioned is a power supply comprised of batteries positioned in the housing 12.

A transmitter 28 is adapted for sending a signal over a distance between ¼ a mile and 1 mile. The transmitter 28 is positioned in the housing 12 and is operationally coupled to the microprocessor 20.

An actuator 30 for actuating the transmitter 28 is electrically coupled to the microprocessor 20. The actuator 30 comprises a switch mounted on the top side 13 of the housing 12.

A receiving means 32, or receiver, for receiving a transmitted signal is positioned in the housing 12 and is operationally coupled to the microprocessor 20.

An antenna 34 is electrically coupled to the transmitter 28 and the receiving means 20. The antenna 34 extends through the peripheral wall 15 and outwardly away from the housing 12.

A speaker 36 for producing a sound is mounted in the top side 13 of the housing 12. The speaker 36 is electrically coupled to the microprocessor 20. The speaker 36 emits a sound and the light 22 is illuminated when the receiving means 32 receives a signal.

A means for controlling volume 38 of the speaker 36 comprises a dial rotatably coupled to the housing 12. The dial is electrically coupled to the microprocessor 20.

A means for selectively turning off and on 40 the microprocessor 20 comprises a switch mounted in the top side 13 of the housing 12. The switch is electrically coupled to the power supply 24.

A transmitting device 50 for transmitting a signal to the receiving means includes a casing 52. The casing 52 has a first side 53, a second side 54 and a peripheral wall 55 extending therebetween. The casing 52 has a first light 56 and a second light 58 mounted thereon. The casing 52 ideally has an annular member 60 attached thereto to act as a key ring.

Control circuitry 62 is positioned in the casing 52 and is adapted for transmitting a signal over a distance of less than one mile, receiving a signal, and illuminating the first 56 and second 58 lights on the casing. The first 56 and second 58 lights are electrically coupled to the control circuitry 62.

A first actuating means 64 selectively turns on the control circuitry 62 such that the control circuitry 62 transmits a first signal to the receiving means 32. The first actuating means 64 is electrically coupled to the control circuitry 62. The first actuating means comprising a first button mounted on the first side 53 of the casing 52.

A second actuating means 66 actuates the control circuitry 62 such that the control circuitry 62 transmits a second signal to the receiving means 32. The second actuating means 66 is electrically coupled to the control circuitry 62. The second actuating means 66 comprises a second button mounted on the first side 53 of the casing 52.

In use, a first user actuates the first actuating means 64 such that the control circuitry 62 transmits a first signal to the receiving means 32. This causes the light 22 on the housing 12 to be illuminated, the speaker 36 to emit a sound and the first light 56 on the casing 52 to be illuminated. A second user actuates the actuator 30 on the housing 12 such that the microprocessor 20 transmits a signal to the control circuitry 62 so that the second light 58 on the casing 52 is illuminated. The first user actuates the second actuating means 66 such that the control circuitry 62 transmits a second signal to the receiving means 32. In this manner, a first person sitting in an automobile may receive a signal from a second person away from the vehicle, such as in a mall, so that the first person knows that they are to meet the second person at a designated place.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A short-range paging system, said system comprising:
a housing, said housing having a top side, a bottom side and peripheral wall integrally coupled to said bottom and top sides and extending therebetween such that said housing is generally hollow;
a securing means for removably securing said housing to a visor of an automobile;
a microprocessor, said microprocessor being adapted to send a signal to a transmitter, send an audio signal to a speaker, receive a transmitted signal, and illuminate a light, said microprocessor being securely mounted in said housing;
a light, said light being securely mounted to said top side of said housing, said light being electrically coupled to said microprocessor;
a power supply for powering said microprocessor, said power supply being operationally coupled to said microprocessor, said power supply comprising a cord, said the cord having an end having a male plug electrically coupled thereto;
a transmitter, said transmitter being adapted for sending a signal over a distance between one-fourth of a mile and one mile, said transmitter being positioned in said housing and being operationally coupled to said microprocessor;
an actuator for actuating said transmitter, said actuator being electrically coupled to said microprocessor, said actuator comprising a switch mounted on said top side of said housing;
a receiving means for receiving a transmitted signal, said receiving means being positioned in said housing and operationally coupled to said microprocessor;
an antenna, said antenna being electrically coupled to said transmitter and said receiving means, said antenna extending through said peripheral wall and outwardly away from said housing;
a speaker for producing a sound, said speaker being mounted in said top side of said housing, said speaker being electrically coupled to said microprocessor, wherein said speaker emits a sound and said light is illuminated when said receiving means receives a signal;
a means for controlling volume of said speaker comprising a dial rotatably coupled to said housing, said dial being electrically coupled to said microprocessor;
a means for selectively turning off and on said microprocessor comprising a switch, said switch being mounted in said top side of said housing, said switch being electrically coupled to said power supply;
a transmitting device for transmitting a signal to said receiving means, said transmitting device comprising:
a casing, said casing having a first side, a second side and a peripheral wall extending therebetween, said casing having a first light and a second light mounted thereon;
control circuitry, said control circuitry being positioned in said casing and being adapted for transmitting a signal over a distance of less than one mile, receiving a signal, and illuminating said first and second lights on said casing, said first and second lights being electrically coupled to said control circuitry;
a first actuating means for selectively turning on said control circuitry such that said control circuitry transmits a first signal to said receiving means, said first actuating means being electrically coupled to said control-circuitry, said first actuating means comprising a first button mounted on said first side of said casing;
a second actuating means for actuating said control circuitry such that said control circuitry transmits a second signal to said receiving means, said second actuating means being electrically coupled to said control circuitry, said second actuating means comprising a second button mounted on said first side of said casing; and
wherein a first user actuates said first actuating means such that said control circuitry transmits a first signal to said receiving means such that said light on said housing is illuminated, said speaker emits a sound and said first light on said casing is illuminated, wherein a second user actuates said actuator on said housing such that said microprocessor transmits a signal to said control circuitry such that said second light on said casing is illuminated, wherein said first user actuates said second actuating means such that said control circuitry transmits a second signal to said receiving means.

2. A short-range paging system, said system comprising:
- a housing, said housing having a top side, a bottom side and peripheral wall integrally coupled to said bottom and top sides and extending therebetween such that said housing is generally hollow;
- a microprocessor, said microprocessor being adapted to receive a transmitted signal and illuminate a light, said microprocessor being securely mounted in said housing;
- a light, said light being securely mounted to said top side of said housing, said light being electrically coupled to said microprocessor;
- a receiving means for receiving a transmitted signal, said receiving means being positioned in said housing and operationally coupled to said microprocessor;
- a transmitter, said transmitter being adapted for sending a signal over a distance between one-fourth of a mile and one mile, said transmitter being positioned in said housing and being operationally coupled to said microprocessor;
- a transmitting device for selectively transmitting a signal to said receiving means over a distance of less than one mile;
- said transmitting device comprising:
  - a casing, said casing having a first side, a second side and a peripheral wall extending therebetween, said casing having a first light and a second light mounted thereon;
  - control circuitry, said control circuitry being positioned in said casing and being adapted for transmitting a signal, receiving a signal, and illuminating said first and second lights oa said casing, said first and second lights being electrically coupled to said control circuitry;
  - a first actuating means for selectively turning on said control circuitry such that said control circuitry transmits a first signal to said receiving means, said first actuating means being electrically coupled to said control circuitry, said first actuating means comprising a first button mounted on said first side of said casing;
  - a second actuating means for actuating said control circuitry such that said control circuitry transmits a second signal to said receiving means, said second actuating means being electrically coupled to said control circuitry, said second actuating means comprising a second button mounted on said first side of said casing; and
- wherein a first user actuates said first actuating means such that said control circuitry transmits a first signal to said receiving means such that said light on said housing is illuminated, said speaker emits a sound and said first light on said casing is illuminated, wherein a second user actuates said actuator on said housing such that said microprocessor transmits a signal to said control circuitry such that said second light on said casing is illuminated, wherein said first user actuates said second actuating means such that said control circuitry transmits a second signal to said receiving means.

3. The short-range paging system as in claim 2, wherein said device further comprises:
- said microprocessor being adapted to send an audio signal to a speaker; and
- a speaker for producing a sound, said speaker being mounted in said top side of said housing, said speaker being electrically coupled to said microprocessor, wherein said speaker emits a sound when said receiving means receives a signal.

4. The short-range paging system as in claim 2, further including:
- a power supply for powering said microprocessor, said power supply being operationally coupled to said microprocessor, said power supply comprising a cord, said the cord having an end having a male plug electrically coupled thereto.

* * * * *